United States Patent
Takahashi

(10) Patent No.: US 8,971,430 B2
(45) Date of Patent: Mar. 3, 2015

(54) RECEIVING DEVICE, BASE STATION AND WIRELESS COMMUNICATION TERMINAL

(75) Inventor: Hirokazu Takahashi, Kawasaki (JP)

(73) Assignee: Kyocera Corporation (JP)

( * ) Notice: Subject to any disclaimer, the term of this patent is extended or adjusted under 35 U.S.C. 154(b) by 0 days.

(21) Appl. No.: 13/699,576

(22) PCT Filed: May 25, 2011

(86) PCT No.: PCT/JP2011/061941
§ 371 (c)(1),
(2), (4) Date: Nov. 21, 2012

(87) PCT Pub. No.: WO2011/148964
PCT Pub. Date: Dec. 1, 2011

(65) Prior Publication Data
US 2013/0070822 A1    Mar. 21, 2013

(30) Foreign Application Priority Data

May 25, 2010   (JP) .................................. 2010-119405
May 25, 2010   (JP) .................................. 2010-119406

(51) Int. Cl.
*H04K 1/10* (2006.01)
*H04L 27/28* (2006.01)
*H04J 11/00* (2006.01)
*H04L 27/26* (2006.01)

(52) U.S. Cl.
CPC ......... *H04J 11/0023* (2013.01); *H04L 27/2657* (2013.01); *H04L 27/2686* (2013.01); *H04L 27/2688* (2013.01)
USPC ........................................ 375/260; 375/259

(58) Field of Classification Search
USPC .......................................................... 375/260
See application file for complete search history.

(56) References Cited

U.S. PATENT DOCUMENTS

| 6,807,241 | B1 | 10/2004 | Milbar et al. |
| 7,158,475 | B1 | 1/2007 | Ikeda et al. |
| 7,403,575 | B2 | 7/2008 | Gehring et al. |
| 7,672,674 | B2 * | 3/2010 | Mahany et al. ............ 455/452.2 |
| 2003/0085766 | A1 | 5/2003 | Rogerson |
| 2003/0223354 | A1 * | 12/2003 | Olszewski .................... 370/208 |
| 2004/0242175 | A1 * | 12/2004 | Lin .............................. 455/147 |
| 2005/0141662 | A1 * | 6/2005 | Sano et al. .................... 375/376 |

(Continued)

FOREIGN PATENT DOCUMENTS

| EP | 1168617 A2 | 8/2001 |
| JP | 04-057415 A | 2/1992 |

(Continued)

OTHER PUBLICATIONS

International Search Report; PCT/JP2011/061941; Jul. 5, 2011.

(Continued)

*Primary Examiner* — Erin File
(74) *Attorney, Agent, or Firm* — Studebaker & Brackett PC

(57) ABSTRACT

Deterioration of reception characteristics due to interference waves is suppressed. A receiving device includes a communication unit, which subtracts a frequency of an intended wave subcarrier from a frequency of interference waves if the interference waves are present in a reception signal, divides the result of the subtraction by a frequency interval of the subcarrier, sets the remainder of the division as an offset frequency, and thus changes reception frequency setting based on the offset frequency.

20 Claims, 9 Drawing Sheets

(56) References Cited

U.S. PATENT DOCUMENTS

| | | | |
|---|---|---|---|
| 2006/0153283 A1* | 7/2006 | Scharf et al. | 375/148 |
| 2007/0201345 A1* | 8/2007 | Geile et al. | 370/203 |
| 2009/0279442 A1* | 11/2009 | Rave | 370/246 |
| 2009/0304100 A1 | 12/2009 | Brehler et al. | |
| 2010/0027482 A1 | 2/2010 | Murakami et al. | |
| 2010/0157786 A1 | 6/2010 | Akita et al. | |
| 2011/0007694 A1* | 1/2011 | Kim et al. | 370/329 |
| 2011/0037505 A1* | 2/2011 | Kawamoto | 327/159 |
| 2011/0075721 A1* | 3/2011 | Minakawa et al. | 375/238 |
| 2011/0103333 A1 | 5/2011 | Berggren et al. | |
| 2012/0182953 A1 | 7/2012 | Murakami et al. | |
| 2012/0324308 A1* | 12/2012 | Goto et al. | 714/752 |
| 2013/0002318 A1* | 1/2013 | Lu et al. | 327/156 |
| 2013/0040583 A1* | 2/2013 | Kim et al. | 455/84 |

FOREIGN PATENT DOCUMENTS

| | | |
|---|---|---|
| JP | H06-224870 A | 8/1994 |
| JP | H07-283806 A | 10/1995 |
| JP | H10-126311 A | 5/1998 |
| JP | 2000-269917 A | 9/2000 |
| JP | 2001-119333 A | 4/2001 |
| JP | 2001-144727 A | 5/2001 |
| JP | 2001-177486 A | 6/2001 |
| JP | 2002-77288 A | 3/2002 |
| JP | 2002-111621 A | 4/2002 |
| JP | 2004-260335 A | 9/2004 |
| JP | 2005-203898 A | 7/2005 |
| JP | 2006-503452 A | 1/2006 |
| JP | 2007-243698 A | 9/2007 |
| JP | 2007-300192 A | 11/2007 |
| WO | 2009/152177 A2 | 12/2009 |
| WO | 2009/152657 A1 | 12/2009 |

OTHER PUBLICATIONS

An Office Action; "Notice of Reasons for Rejection," issued by the Japanese Patent Office on Nov. 19, 2013, which corresponds to Japanese Patent Application No. 2010-119405 and is related to U.S. Appl. No. 13/699,576; with English concise explanation.

Sumasu et al.; "An Anti-frequency-offset Multi-carrier Modulation System"; Technical report of IEICE; RCS 96(213); The Institute of Electronics; Information and Communication Engineers; pp. 119-124; Aug. 9, 1996.

An Office Action; "Notice of Reasons for Rejection," issued by the Japanese Patent Office on Dec. 25, 2013, which corresponds to Japanese Patent Application No. 2010-119406 and is related to U.S. Appl. No. 13/699,576; with English language concise explanation.

* cited by examiner

RECEIVING DEVICE, BASE STATION AND WIRELESS COMMUNICATION TERMINAL

TECHNICAL FIELD

The present invention relates to a receiving device, a base station, and a wireless communication terminal.

BACKGROUND ART

At present, communication systems that adopt LTE (Long Term Evolution) and WiMAX (Worldwide Interoperability for Microwave Access) based on OFDM (Orthogonal Frequency Division Multiplexing) have appeared. As for the location form of base stations of such a communication system, a low-output microcell base station is arranged between cells that are unable to be covered by a high-output macrocell base station.

In this case, if a terminal exists at an edge of a cell of a macrocell base station, the terminal transmits high-level power to the macrocell base station. Accordingly, radio waves of the terminal become interference waves, and the interference waves deteriorate uplink performance (reception characteristics) of the microcell base station and downlink performance (reception characteristics) of the terminal in the cell of the microcell base station. For example, if frequency deviation (Doppler shift) occurs in an OFDM signal which is output by the terminal due to high-speed movement of the terminal (or reflection of radio waves for fixed communication by an object that moves at high speed), the OFDM signal becomes the interference waves to deteriorate the reception characteristics of the microcell base station and the reception characteristics of the terminal in the cell of the microcell base station.

In order to solve this problem, Japanese Unexamined Patent Application Publication No. 2001-119333 discloses a moving object communication system which corrects an amount of Doppler shift of a transmission wave by calculating a moving speed of the mobile station, a latitude and a longitude using a GPS satellite, obtaining an angle between the mobile station and a base station based on the moving speed, the latitude and the longitude, calculating the amount of Doppler shift of the transmission wave from the angle, and performing fine adjustment of the transmission wave of the mobile station based on the result of the calculation.

SUMMARY OF INVENTION

Meanwhile, although the related art as described above can suppress the generation of interference waves due to the Doppler shift by correcting the Doppler shift, the interference waves are generated by various causes in addition to the Doppler shift. Accordingly, in the related art, if the interference waves are generated by causes except for the Doppler shift, it is not possible to suppress deterioration of the reception characteristics due to the interference waves. Specifically, if an offset frequency becomes 1/2 times of a subcarrier frequency interval, the interference waves and the subcarrier have correlation, and thus the reception characteristics are most severely deteriorated (for example, see FIG. 9A).

Accordingly, the present invention has been made in consideration of the above-described situations, and an object of the present invention is to suppress deterioration of the reception characteristics due to interference waves.

From the above-described view point, according to a first aspect of the present invention, a receiving device that receives a wireless signal based on a multicarrier communication method using a plurality of subcarriers includes a communication unit, which subtracts a frequency of an intended wave subcarrier from a frequency of interference waves if the interference waves are present in a reception signal, divides the result of the subtraction by a frequency interval of the subcarrier, sets the remainder of the division as an offset frequency, and thus changes reception frequency setting based on the offset frequency.

The receiving device may receive the wireless signal from a transmitting device, and the communication unit may calculate the offset frequency, change the reception frequency setting based on the offset frequency, and transmit an instruction to change a transmission frequency based on the offset frequency to the transmitting device.

In the receiving device, the communication unit may detect the interference waves of the reception signal if an error rate of the reception signal exceeds a predetermined threshold value, and calculate the offset frequency if the interference waves are present in the reception signal.

In the receiving device, the error rate may be a FER (Frame Error Rate).

According to a second aspect of the present invention, a base station that receives a wireless signal based on a multicarrier communication method using a plurality of subcarriers includes a communication unit, which subtracts a frequency of an intended wave subcarrier from a frequency of interference waves if the interference waves are present in a reception signal, divides the result of the subtraction by a frequency interval of the subcarrier, sets the remainder of the division as an offset frequency, and thus changes reception frequency setting based on the offset frequency.

The base station may receive the wireless signal from a terminal, and the communication unit may calculate the offset frequency, change the reception frequency setting based on the offset frequency, and transmit an instruction to change a transmission frequency based on the offset frequency to the transmitting device.

In the base station, the communication unit may detect the interference waves of the reception signal if an error rate of the reception signal exceeds a predetermined threshold value, and calculate the offset frequency if the interference waves are present in the reception signal.

In the base station, the error rate may be a FER (Frame Error Rate).

According to a third aspect of the present invention, a wireless communication terminal that receives a wireless signal based on a multicarrier communication method using a plurality of subcarriers includes a communication unit, which subtracts a frequency of an intended wave subcarrier from a frequency of interference waves if the interference waves are present in a reception signal, divides the result of the subtraction by a frequency interval of the subcarrier, sets the remainder of the division as an offset frequency, and thus changes reception frequency setting based on the offset frequency.

The wireless communication terminal may receive the wireless signal from a base station, and the communication unit may calculate the offset frequency, change the reception frequency setting based on the offset frequency, and transmit an instruction to change a transmission frequency based on the offset frequency to the base station.

In the wireless communication terminal, the communication unit may detect the interference waves of the reception signal if an error rate of the reception signal exceeds a predetermined threshold value, and calculate the offset frequency if the interference waves are present in the reception signal.

In the wireless communication terminal, the error rate may be a FER (Frame Error Rate).

According to the present invention, the communication unit subtracts the frequency of the intended wave subcarrier from the frequency of the interference waves if the interference waves are present in the reception signal, divides the result of the subtraction by the frequency interval of the subcarrier, sets the remainder of the division as the offset frequency, and thus changes the reception frequency setting based on the offset frequency. As described above, through changing the reception frequency setting based on the offset frequency, the signal that has no correlation with the interference waves can be received, and thus the deterioration of the reception characteristics due to the interference waves can be suppressed due to demodulating the signal.

DESCRIPTION OF EMBODIMENTS

First Embodiment

Hereinafter, a first embodiment of the present invention will be described with reference to FIGS. 1 to 4.

Figure 1:
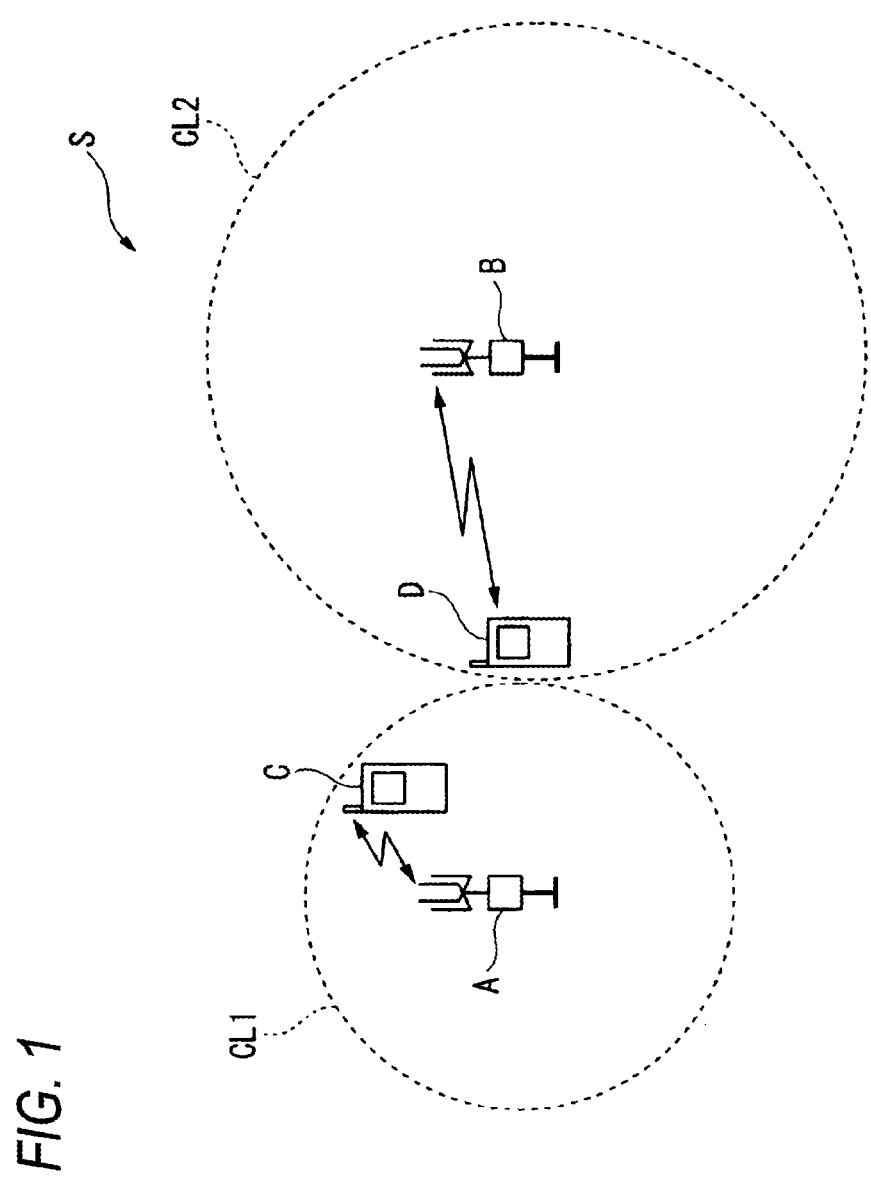
FIG. 1 is a system configuration diagram illustrating a wireless communication system S provided with a microcell base station A according to a first embodiment of the invention.

A wireless communication system S is a communication system that adopts an OFDM (Orthogonal Frequency Division Multiplexing) method, and as shown in FIG. 1, includes a microcell base station A according to the first embodiment, a macrocell base station B, and terminals C and D.

The microcell base station A is a low-output base station to cover a cell gap between a high-output macrocell base station B and another macrocell base station (not illustrated). The microcell base station A forms a cell CL1 and communicates with a terminal C that is located in the cell CL1.

The macrocell base station B is a high-output base station. The macrocell base station B forms a cell CL2 and communicates with a terminal D that is located in the cell CL2.

The terminal C is located in the cell CL1 of the microcell base station A, and communicates with the microcell base station A to perform audio communication or data communication.

The terminal D is located in the cell CL2 of the macrocell base station B, and communicates with the macrocell base station B to perform audio communication or data communication.

Figure 2:
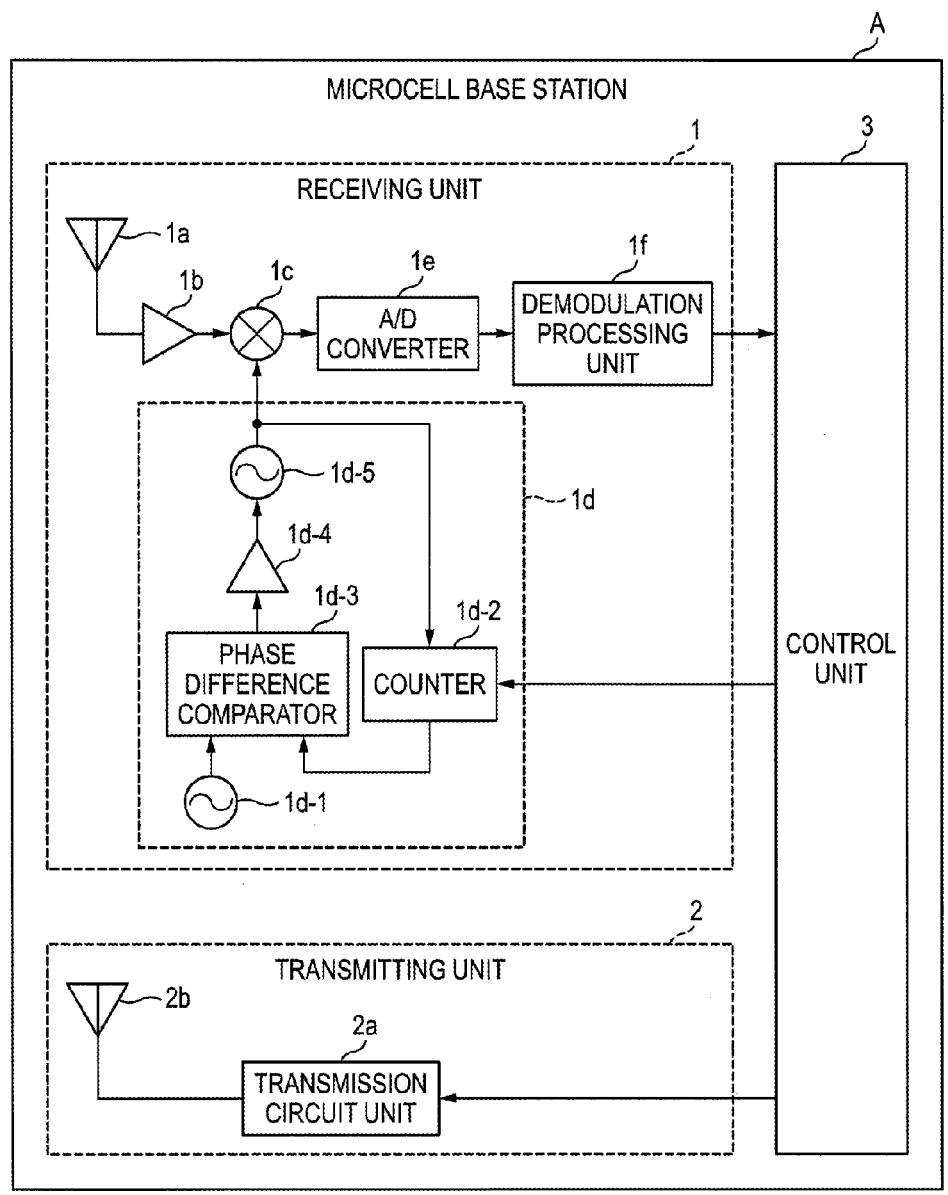
FIG. 2 is a functional block diagram of a microcell base station A according to the first embodiment of the invention.

The functional configuration of the microcell base station will be described with reference to FIG. 2.

The microcell base station A is configured by a receiving unit 1, a transmitting unit 2, and a control unit 3. The receiving unit 1, the transmitting unit 2, and the control unit 3 configure a communication unit according to a first embodiment.

The receiving unit 1 is configured by an antenna 1$a$, an amplifier 1$b$, a mixer 1$c$, a frequency adjustment unit 1$d$, an A/D converter 1$e$, and a demodulation processing unit 1$f$.

The antenna 1$a$ outputs a reception signal that is received therethrough to the amplifier 1$b$.

The amplifier 1$b$ amplifies the reception signal input from the antenna 1$a$ and outputs the amplified reception signal to the mixer 1$c$.

The mixer 1$c$ performs frequency conversion (down-conversion) of the reception signal to an IF reception signal having an IF frequency by mixing the reception signal input from the amplifier 1$b$ and a local signal input from the frequency adjustment unit 1$d$, and outputs the IF reception signal to the A/D converter 1$e$.

The frequency adjustment unit 1$d$ generates a local signal for IF frequency conversion and outputs the local signal to the mixer 1$c$. The frequency adjustment unit 1$d$ is configured by a reference pulse generator 1$d$-1, a counter 1$d$-2, a phase comparator 1$d$-3, a loop filter 1$d$-4, and a local signal oscillator 1$d$-5.

The reference pulse oscillator 1$d$-1 is configured by a quartz vibrator or a ceramic vibrator, and generates a reference pulse signal based on periodic vibration of the vibrator to output the reference pulse signal to the phase comparator 1$d$-3.

The counter 1$d$-2 divides the local signal input from the local signal oscillator 1$d$-5 based on a frequency division ratio that is set in a register by the control unit 3, and outputs the divided pulse signal to the phase comparator 1$d$-3.

The phase comparator 1$d$-3 generates a phase difference pulse signal based on a phase difference between the reference pulse signal input from the reference pulse oscillator 1$d$-1 and the pulse signal input from the counter 1$d$-2, and outputs the phase difference pulse signal to the loop filter 1$d$-4.

The loop filter 1$d$-4 outputs a voltage signal that is obtained by integrating the phase difference pulse signal input from the phase comparator 1$d$-3 to the local signal oscillator 1$d$-5.

The local signal oscillator 1$d$-5 generates the local signal for IF frequency conversion having a frequency based on the voltage signal input from the loop filter 1$d$-4 to output the local signal to the mixer 1$c$.

The A/D converter 1$e$ converts the IF reception signal input from the mixer 1$c$ into a digital IF reception signal to output the digital IF reception signal to the demodulation processing unit 1$f$.

The demodulation processing unit if performs a demodulation process based on an OFDM method or SC-FDMA method, such as a Fourier transform process, digital demodulation process, and a parallel-serial conversion process, with respect to the digital IF reception signal input from the A/D converter 1$e$, and outputs the demodulated signal to the control unit 3 as a baseband reception signal. The demodulation processing unit if detects the interference waves included in the digital IF reception signal during the Fourier transform processing, and notifies the control unit 3 of the frequency of the interference waves. Further, the demodulation processing unit 1f detects a FER (Frame Error Rate) of the reception signal based on the digital IF reception signal, and notifies the control unit 13 of the FER.

The transmitting unit 2 is configured by a transmission circuit unit 2a and an antenna 2b.

The transmission circuit unit 2a modulates the baseband transmission signal input from the control unit 3 and outputs a modulated signal to the antenna 2b as a transmission signal.

The antenna 2b transmits the transmission signal input from the transmission circuit unit 2a to an outside. The control unit 3 is configured by a CPU (Central Processing Unit), a ROM (Read Only Memory), a RAM (Random Access Memory), and an interface circuit that performs an input/output of signals with the respective units. The control unit 3 controls the overall operation of the microcell base station. A based on control programs stored in the ROM and the reception signal received by the receiving unit 1. On the other hand, the control programs stored in the ROM include an interference suppression program for a base station, and the control unit 3 suppresses the deterioration of the reception characteristics due to the interference waves based on the interference suppression program for the base station.

Figure 3:
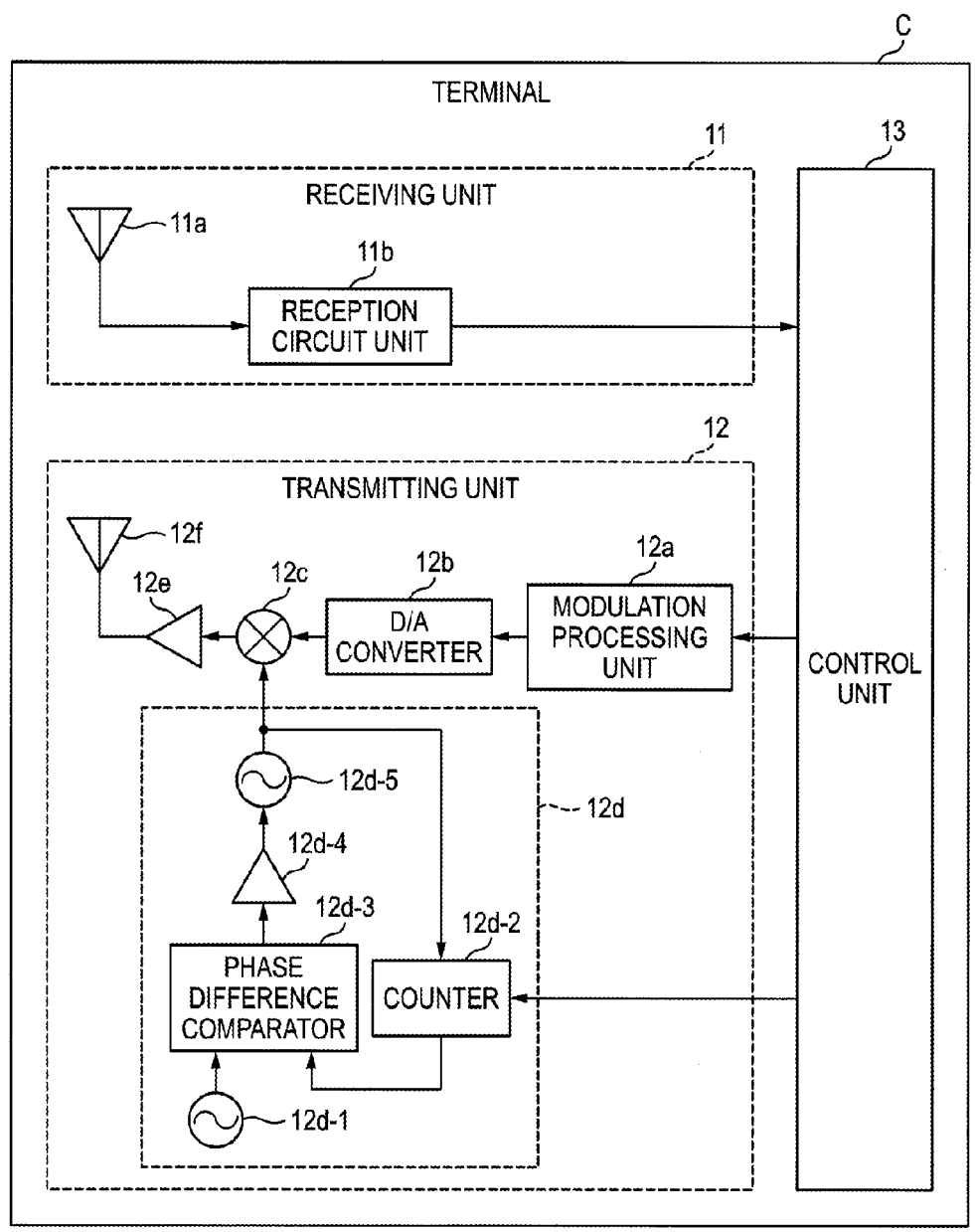
FIG. 3 is a functional block diagram of a terminal C according to the first embodiment of the invention.

Next, the functional configuration of the terminal C will be described with reference to FIG. 3.

The terminal C is configured by a receiving unit 11, a transmitting unit 12, and a control unit 13. The receiving unit 11 is configured by an antenna 11a and a reception circuit unit 11b.

The antenna 11a outputs the reception signal received therethrough to the reception circuit unit 11b.

The reception circuit unit 11b demodulates the reception signal under the control of the control unit 13 and outputs the demodulated signal to the control unit 13 as a baseband reception signal.

The transmitting unit 12 is configured by a modulation processing unit 12a, a D/A converter 12b, a mixer 12c, a frequency adjustment unit 12d, an amplifier 12e, and an antenna 12f.

The modulation processing unit 12a performs a modulation process based on an OFDM method or SCFDM method, such as a serial-parallel conversion process, a digital modulation process, and a Fourier transform process, with respect to the baseband transmission signal input from the control unit 13, and outputs the modulated signal to the D/A converter 12b as a digital IF transmission signal.

The D/A converter 12b converts the digital IF transmission signal input from the mixer 12c into an analog IF transmission signal, and outputs the analog IF transmission signal to the mixer 12c as the IF transmission signal.

The mixer 12c performs frequency conversion (up-conversion) of the IF transmission signal to an RF transmission signal having an RF frequency by mixing the IF transmission signal input from the D/A converter 12b and the local signal input from the frequency adjustment unit 1d, and outputs the transmission signal to the amplifier 12c.

The frequency adjustment unit 12d generates a local signal for RF frequency conversion and outputs the local signal to the mixer 12c. The frequency adjustment unit 12d is configured by a reference pulse generator 12d-1, a counter 12d-2, a phase comparator 12d-3, a loop filter 12d-4, and a local signal oscillator 12d-5.

The reference pulse oscillator 12d-1 is configured by a quartz vibrator or a ceramic vibrator, and generates a reference pulse signal based on periodic vibration of the vibrator to output the reference pulse signal to the phase comparator 12d-3.

The counter 12d-2 divides the local signal input from the local signal oscillator 12d-5 based on a frequency division ratio that is set in a register by the control unit 3, and outputs the divided pulse signal to the phase comparator 12d-3.

The phase comparator 12d-3 generates a phase difference pulse signal based on a phase difference between the reference pulse signal input from the reference pulse oscillator 12d-1 and the pulse signal input from the counter 12d-2, and outputs the phase difference pulse signal to the loop filter 12d-4.

The loop filter 12d-4 outputs a voltage signal that is obtained by integrating the phase difference pulse signal input from the phase comparator 12d-3 to the local signal oscillator 12d-5.

The local signal oscillator 12d-5 generates the local signal for RF frequency conversion having a frequency based on the voltage signal input from the loop filter 12d-4 to output the local signal to the mixer 12c.

The amplifier 12e amplifies the transmission signal input from the mixer 12c and outputs the amplified transmission signal to the antenna 12f.

The antenna 12f transmits the transmission signal input from the amplifier 12e to an outside.

The control unit 13 is configured by a CPU (Central Processing Unit), a ROM (Read Only Memory), a RAM (Random Access Memory), and an interface circuit that performs an input/output of signals with the respective units. The control unit 13 controls the overall operation of the terminal C based on control programs stored in the ROM and the reception signal received by the receiving unit 11. On the other hand, the control programs stored in the ROM include an interference suppression program for a terminal, and the control unit 13 suppresses the deterioration of the reception characteristics due to the interference waves based on the interference suppression program for the terminal.

Figure 4:
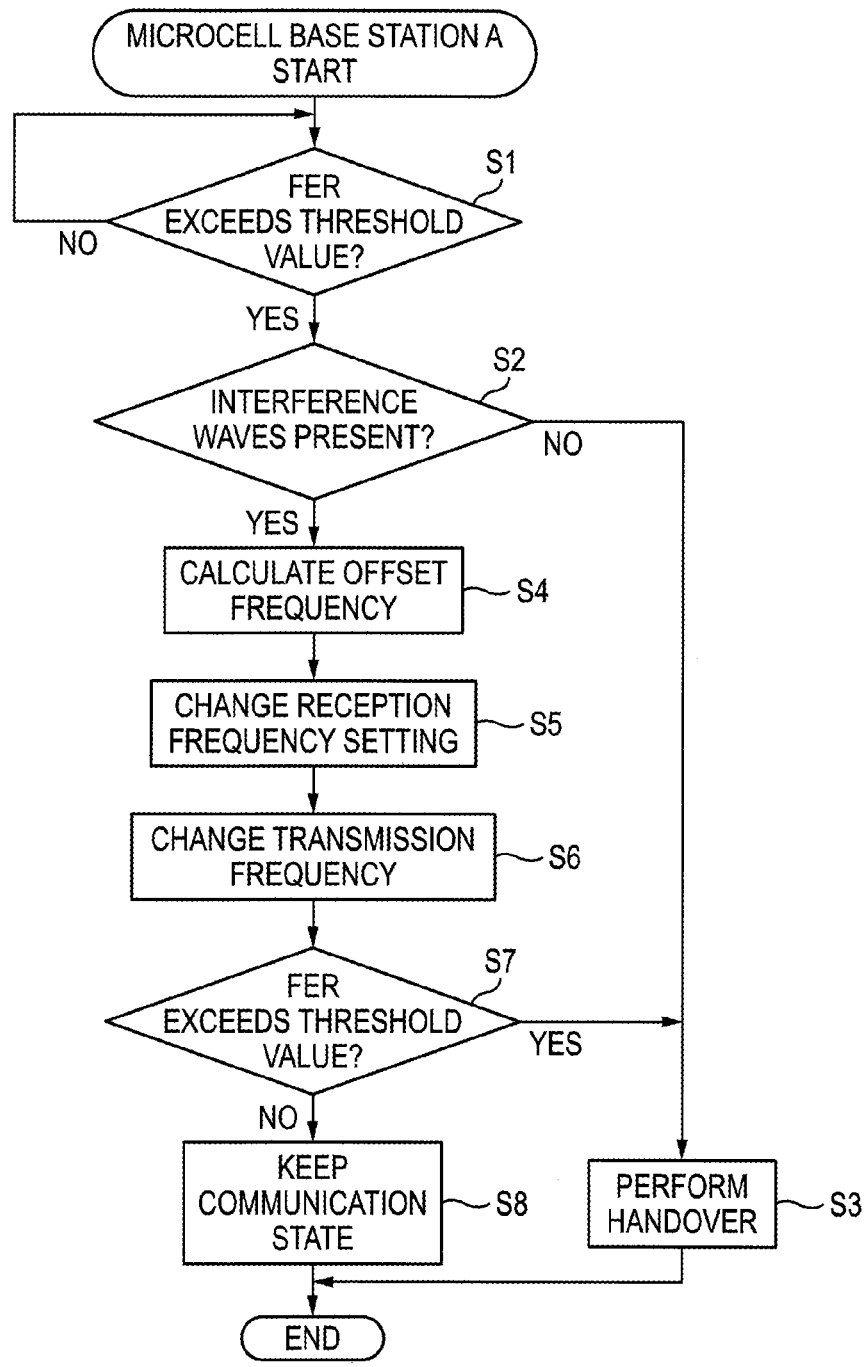
FIG. 4 is a flowchart illustrating the operation of the microcell base station A according to the first embodiment of the invention.

Next, the operation of the microcell base station A according to the first embodiment will be described with reference to FIG. 4.

First, if the receiving unit 1 receives the reception signal from the terminal C, the control unit 3 of the microcell base station A controls the demodulation processing unit 1f to detect the FER of the reception signal and determines whether the FER of the reception signal exceeds a predetermined threshold value based on the notification from the demodulation processing unit if (step S1).

If "NO" is determined in step S1, that is, if the FER does not exceed the threshold value, the control unit 3 waits for the next reception signal in step S1. If "YES" is determined in step S1, that is, if the FER exceeds the threshold value, the control unit 3 controls the demodulation processing unit if to detect the interference waves and determines whether the interference waves are present based on the notification from the demodulation processing unit if (step S2).

If "NO" is determined in step S2, that is, if the interference waves are not present in the reception signal, the control unit 3 transmits an instruction to perform handover to the terminal C (step S3). If "YES" is determined in step S2, that is, if the interference waves are present in the reception signal, the control unit 3 subtracts the frequency fc (center frequency) of an intended wave subcarrier from the frequency fa of interference waves, divides the result of the subtraction by a frequency interval of the subcarrier, and calculates the remainder of the division as an offset frequency $\Delta fa$ (step S4).

That is, the offset frequency Δfa is calculated based on the following equation (1).

[Equation 1]

$$\Delta fa = |fa - fc| \mod fs \quad (1)$$

Figure 9A:
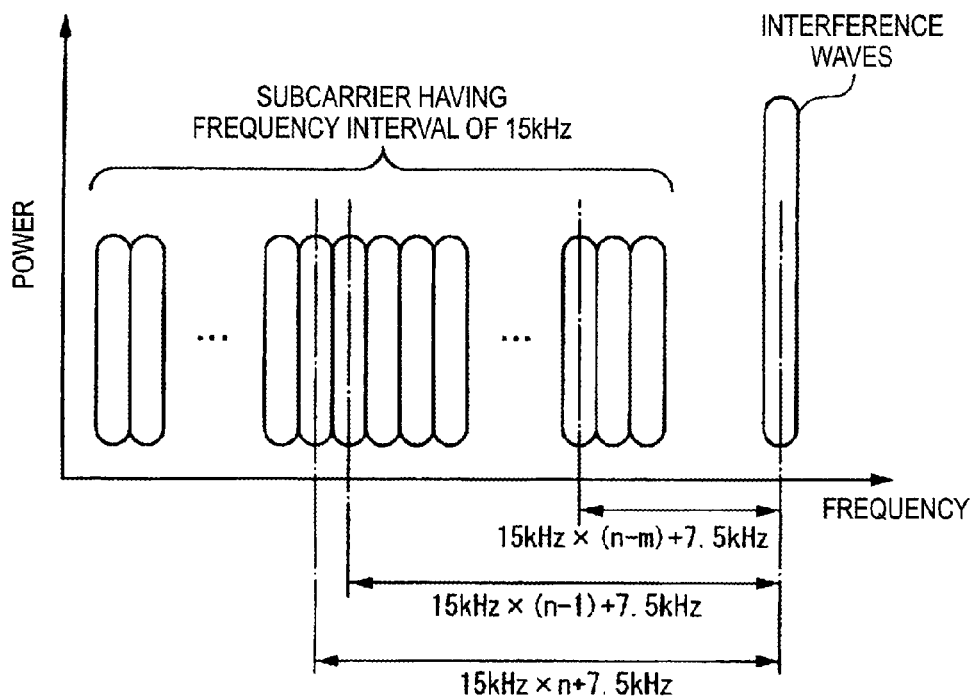
FIG. 9A is a diagram illustrating an example in which interference waves and a subcarrier have correlation with each other.

For example, as shown in FIG. 9A, in the case where the frequency interval of the subcarrier is 15 kHz, in step S4, a value, which is obtained by subtracting the frequency of the intended wave subcarrier from the frequency of the interference waves, is divided by 15 kHz, and the remainder that is 7.5 kHz becomes the offset frequency. On the other hand, in the case where the offset frequency (7.5 kHz) becomes ½ of the frequency interval (15 kHz) of the subcarrier, the reception characteristics are most severely deteriorated.

Figure 9B:
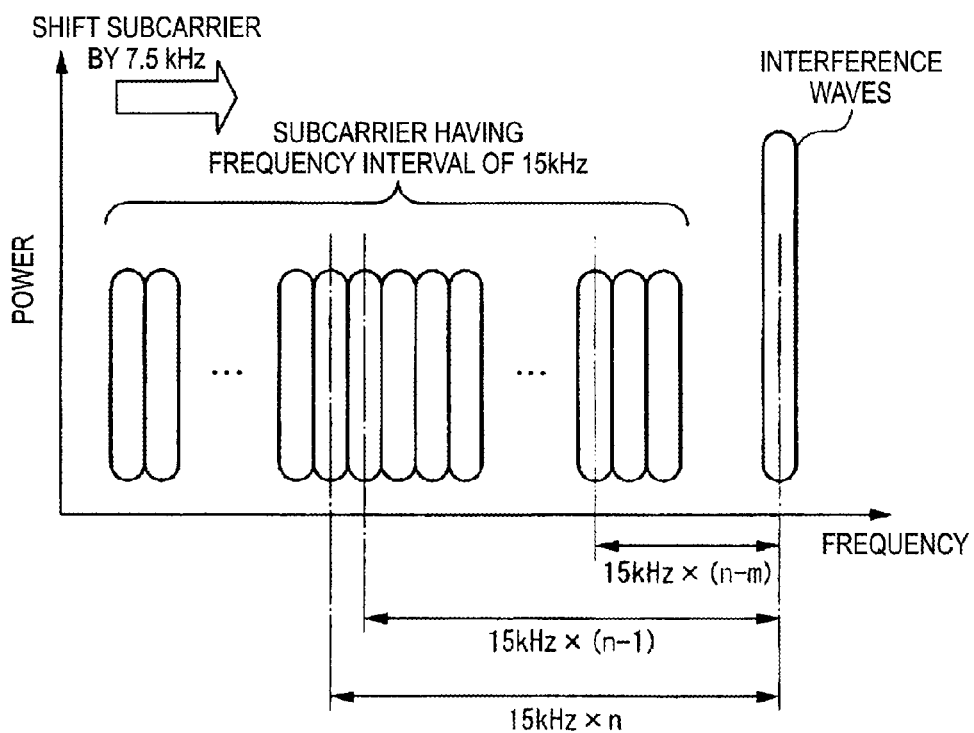
FIG. 9B is a diagram illustrating the change of reception frequency setting based on an offset frequency according to a receiving device according to the invention.

Return to FIG. 4, after step S4, the control unit 3 changes the reception frequency setting of the receiving unit 1 based on the offset frequency (step S5). For example, if the offset frequency is 7.5 kHz as shown in FIG. 9A, the reception frequency setting of the subcarrier is shifted by 7.5 kHz as shown in FIG. 9B, that is, the reception frequency setting of the subcarrier is heightened by 7.5 kHz. On the other hand, the control unit 3 changes the reception frequency setting by changing the setting of the register of the counter 12d-2.

Referring again to FIG. 4, the control unit 3 controls the transmitting unit 2 to transmit the instruction to change the transmission frequency based on the offset frequency to the terminal C (step S6). If the receiving unit 11 receives the instruction from the microcell base station A, the control unit 13 of the terminal C changes the transmission frequency of the transmitting unit 12 based on the offset frequency. For example, if the offset frequency is 7.5 kHz as shown in FIG. 9A, the transmission frequency of the subcarrier is shifted by 7.5 kHz as shown in FIG. 9B, that is, the transmission frequency of the subcarrier is heightened by 7.5 kHz. Additionally, the control unit 13 changes the transmission frequency by changing the setting of the register of the counter 12d-2.

Referring again to FIG. 4, after step 56, the control unit 3 determines whether the FER of the subsequent reception signal exceeds the predetermined threshold value based on the notification from the modulation processing unit if (step S7). If "YES" is determined in step S7, that is, if the FER of the reception signal exceeds the threshold value, the control unit 3 determines that the reception signal has not been improved and transmits an instruction to perform handoff to the terminal C in step S3. If "NO" is determined in step S7, that is, if the FER of the reception signal does not exceed the threshold value, the control unit 3 maintains the communication state with the terminal C (step S8).

As described above, in the microcell base station A according to the first embodiment, the demodulation processing unit if detects the interference waves from the digital IF reception signal, and the control unit 3 subtracts the frequency of the intended wave subcarrier from the frequency of the interference waves, divides the result of the subtraction by the frequency interval of the subcarrier, sets the remainder of the division as the offset frequency, and thus changes the reception frequency setting of the receiving unit 1 based on the offset frequency. Accordingly, the reception frequency setting is changed based on the offset frequency, and even if the frequency deviation (Doppler shift) occurs in the transmission signal due to high-speed movement of the terminal D to cause the interference waves with respect to the microcell base station A, the signal that has no correlation with the interference waves can be received, and thus the deterioration of the reception characteristics due to the interference waves can be suppressed through demodulating the signal. Further, in the microcell base station A, since the operation process to be performed is only the calculation of the offset frequency, the processing is simplified, and the development cost can be reduced.

Second Embodiment

Hereinafter, a second embodiment of the present invention will be described with reference to FIGS. 5 to 8. In the drawing and in the following description, the same reference numerals are given to the constituent elements that are common in the first embodiment, and the duplicate description of the contents as described according to the first embodiment may be omitted.

Figure 5:
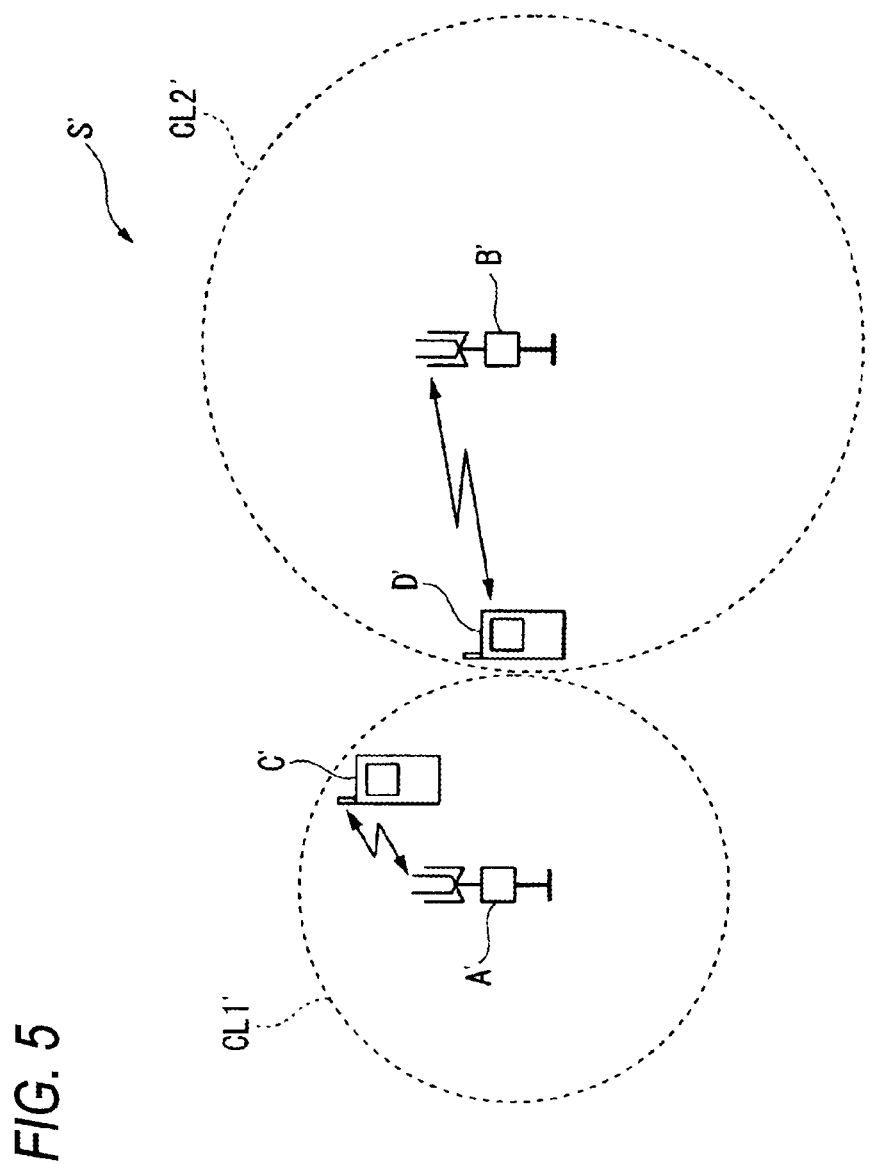
FIG. 5 is a system configuration diagram illustrating a wireless communication system S' provided with a terminal C' according to a second embodiment of the invention.

A wireless communication system S' according to the second embodiment is a communication system that adopts an OFDM method, and as shown in FIG. 5, includes a microcell base station A' according to the second embodiment, a macrocell base station B', and terminals C' and D'. The microcell base station A' is a low-output base station that covers a cell gap between a high-output macrocell base station B' and another macrocell base station (not illustrated). The microcell base station A' forms a cell CL1' and communicates with a terminal C' that is located in the cell CL1' in the OFDM method or the like. The macrocell base station B' is a high-output base station. The macrocell base station B' forms a cell CL2' and communicates with a terminal D' that is located in the cell CL2' in the OFDM method or the like.

Figure 6:
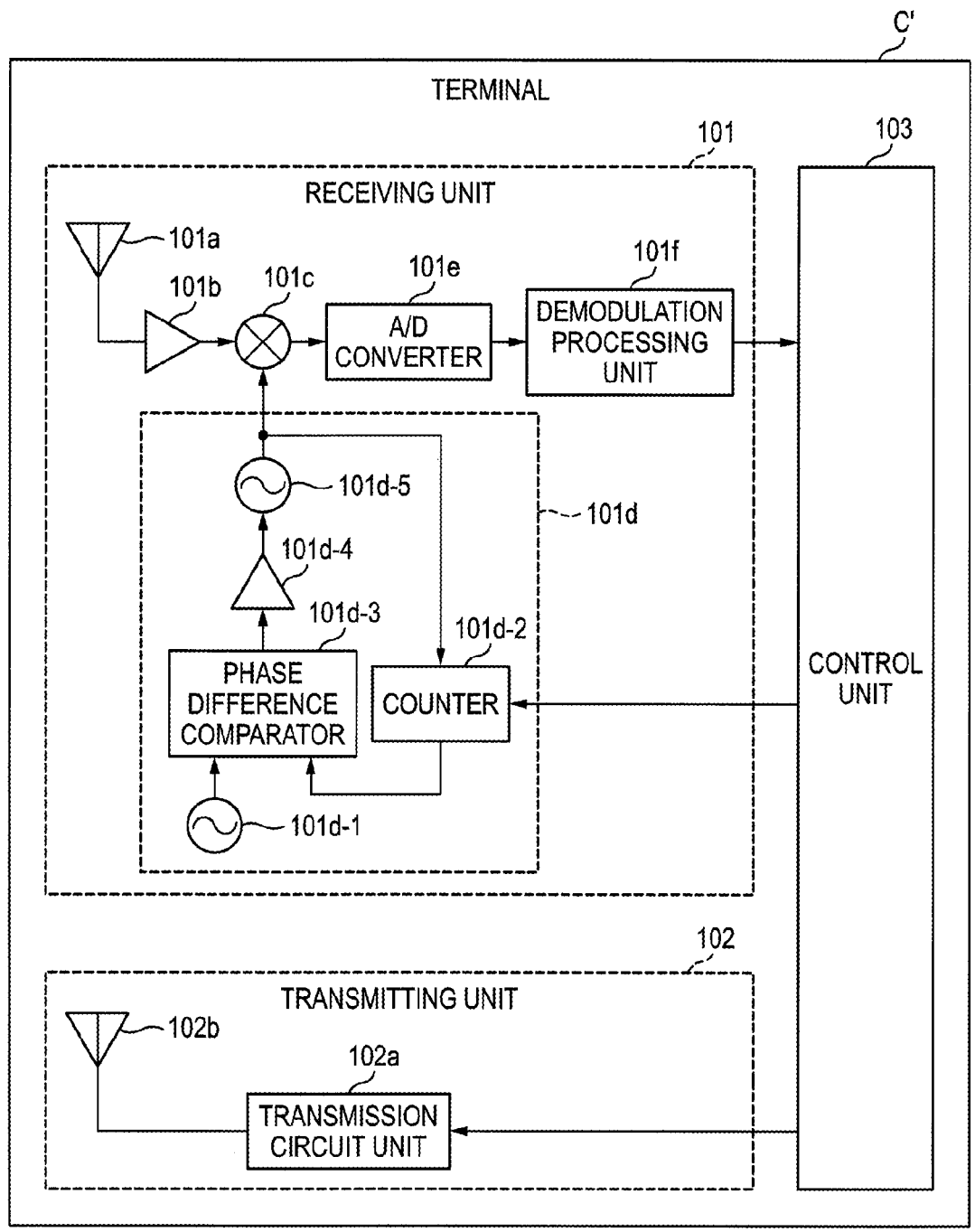
FIG. 6 is a functional block diagram of a terminal C' according to the second embodiment of the invention.

The functional configuration of the terminal C' will be described with reference to FIG. 6.

The terminal C' is configured by a receiving unit 101, a transmitting unit 102, and a control unit 103. The receiving unit 101, the transmitting unit 102, and the control unit 103 configure a communication unit according to a second embodiment.

The receiving unit 101 is configured by an antenna 101a, an amplifier 101b, a mixer 101c, a frequency adjustment unit 101d, an A/D converter 101e, and a demodulation processing unit 101f.

The frequency adjustment unit 101d generates a local signal for IF frequency conversion and outputs the local signal to the mixer 101c. The frequency adjustment unit 101d is configured by a reference pulse generator 101d-1, a counter 101d-2, a phase comparator 101d-3, a loop filter 101d-4, and a local signal oscillator 101d-5.

The transmitting unit 102 is configured by a transmission circuit unit 102a and an antenna 102b. The transmission circuit unit 102a modulates the baseband transmission signal input from the control unit 103 and outputs a modulated signal to the antenna 102b as a transmission signal. The antenna 102b transmits the transmission signal input from the transmission circuit unit 102a to an outside.

The control unit 103 is configured by a CPU, a ROM, a RAM, and an interface circuit that performs an input/output of signals with the respective units. The control unit 103 controls the overall operation of the terminal C' based on control programs stored in the ROM and the reception signal received by the receiving unit 101. On the other hand, the control programs stored in the ROM include an interference suppression program for a terminal, and the control unit 103 suppresses the deterioration of the reception characteristics due to the interference waves based on the interference suppression program for the terminal.

Figure 7:
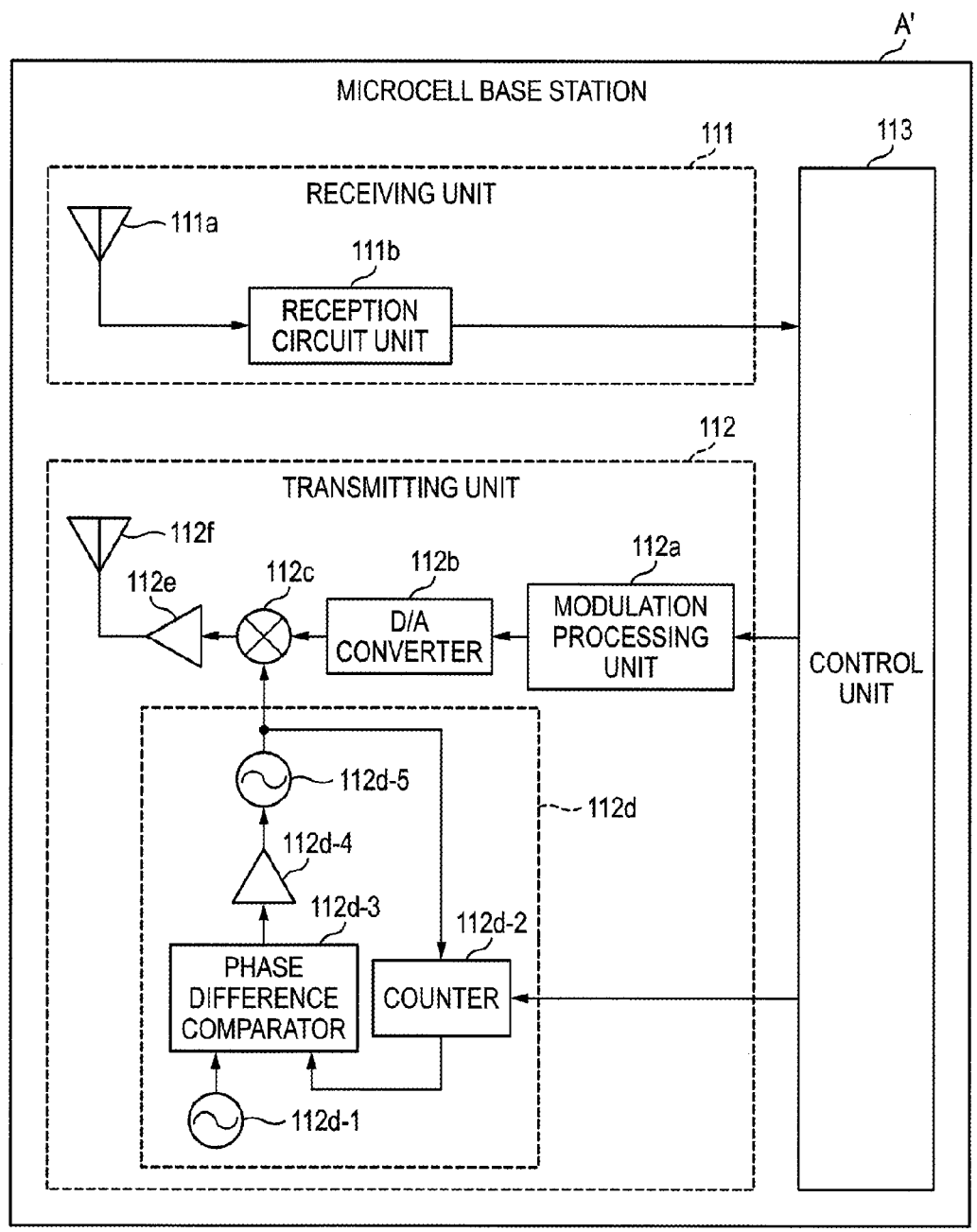
FIG. 7 is a functional block diagram of a microcell base station A' according to the second embodiment of the invention.

Next, the functional configuration of the microcell base station A' will be described with reference to FIG. 7.

The microcell base station A' is configured by a receiving unit 111, a transmitting unit 112, and a control unit 113. The receiving unit 111 is configured by an antenna 111a and a reception circuit unit 111b. The antenna 111a outputs the reception signal received therethrough to the reception circuit unit 111b. The reception circuit unit 111b demodulates the reception signal under the control of the control unit 113 and outputs the demodulated signal to the control unit 113 as a baseband reception signal.

The transmitting unit 112 is configured by an OFDM modulation processing unit 112a, a D/A converter 112b, a mixer 112c, a frequency adjustment unit 112d, an amplifier 112e, and an antenna 112f.

The frequency adjustment unit 112d generates a local signal for RF frequency conversion and outputs the local signal to the mixer 112c. The frequency adjustment unit 112d is configured by a reference pulse generator 112d-1, a counter 112d-2, a phase comparator 112d-3, a loop filter 112d-4, and a local signal oscillator 112d-5.

The control unit 113 is configured by a CPU, a ROM, a RAM, and an interface circuit that performs an input/output of signals with the respective units. The control unit 113 controls the overall operation of the microcell base station A' based on control programs stored in the ROM and the reception signal received by the receiving unit 111. On the other hand, the control programs stored in the ROM include an interference suppression program for a base station, and the control unit 113 suppresses the deterioration of the reception characteristics of the terminal C' due to the interference waves based on the interference suppression program for the base station.

Figure 8:
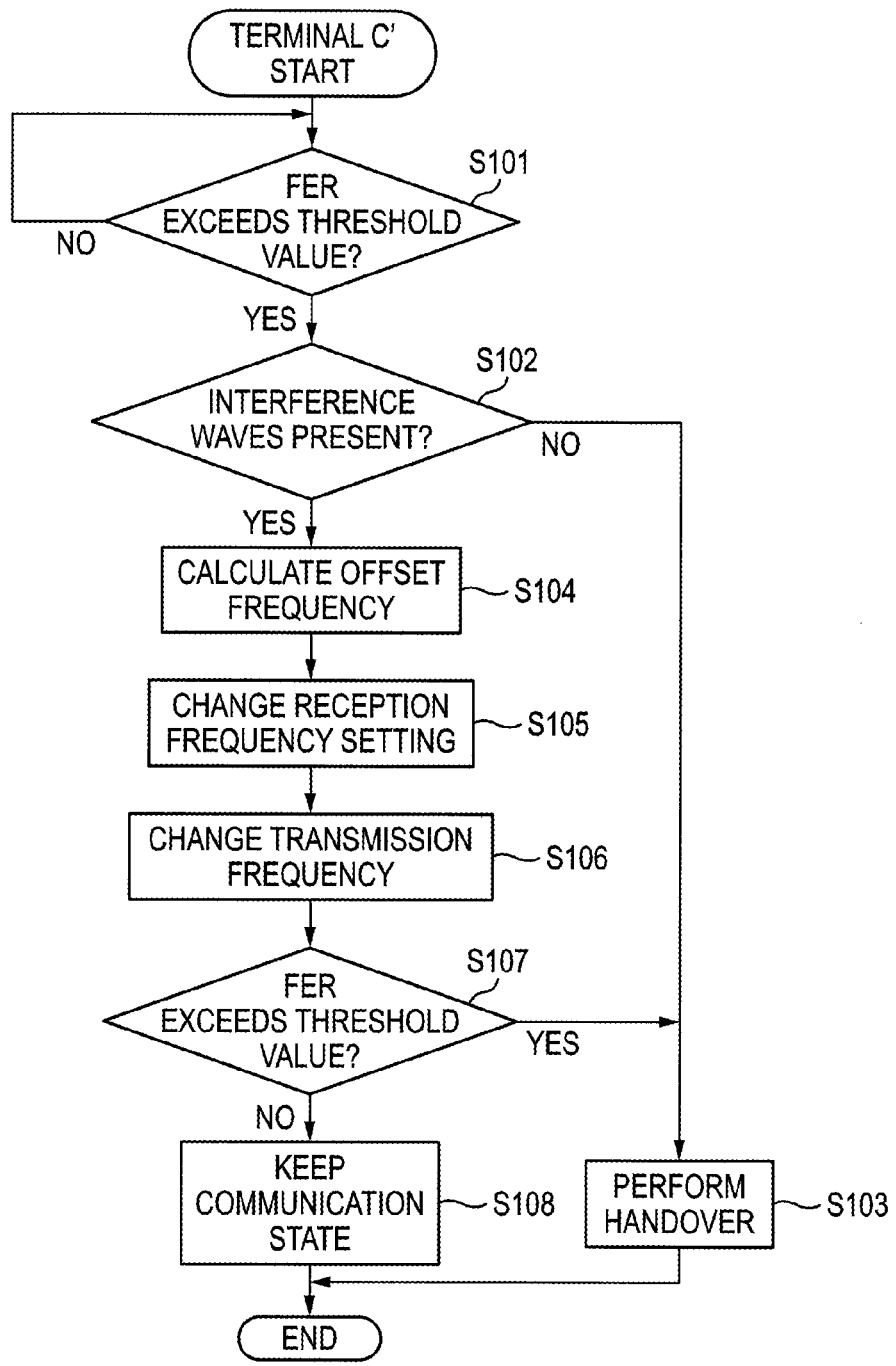
FIG. 8 is a flowchart illustrating the operation of the terminal C' according to the second embodiment of the invention.

Next, the operation of the terminal C' according to the second embodiment will be described with reference to FIG. 8.

First, if the receiving unit 101 receives the reception signal from the microcell base station A', the control unit 103 of the terminal C' controls the demodulation processing unit 101f to detect the FER of the reception signal and determines whether the FER of the reception signal exceeds a predetermined threshold value based on the notification from the demodulation processing unit 101f (step S101).

If "NO" is determined in step S101, that is, if the FER does not exceed the threshold value, the control unit 103 waits for the next reception signal in step S101. If "YES" is determined in step S101, that is, if the FER exceeds the threshold value, the control unit 103 controls the demodulation processing unit 101f to detect the interference waves and determines whether the interference waves are present based on the notification from the demodulation processing unit 101f (step S102).

If "NO" is determined in step S102, that is, if the interference waves are not present in the reception signal, the control unit 103 urges the macrocell base station B' to perform handover (step S103).

If "YES" is determined in step S102, that is, if the interference waves are present in the reception signal, the control unit 103 subtracts the frequency fc (center frequency) of an intended wave subcarrier from the frequency fa of interference waves, divides the result of the subtraction by a frequency interval of the subcarrier, and calculates the remainder of the division as an offset frequency Δfa (step S104).

That is, the offset frequency Δfa is calculated based on the following equation (1).

[Equation 2]

$$\Delta fa = |fa - fc| \bmod fs \quad (1)$$

After step S104, the control unit 103 changes the reception frequency setting of the receiving unit 101 based on the offset frequency (step S105). After step S105, the control unit 103 controls the transmitting unit 2 to transmit an instruction to change the transmission frequency based on the offset frequency to the microcell base station A' (step S106).

Referring again to FIG. 8, after step S106, the control unit 103 determines whether the FER of the reception signal exceeds the predetermined threshold value based on the notification from the modulation processing unit 101f (step S107). If "YES" is determined in step S107, that is, if the FER of the reception signal exceeds the threshold value, the control unit 103 determines that the reception signal has not been improved and transmits an instruction to perform handoff to the macrocell base station B' in step S103. If "NO" is determined in step S107, that is, if the FER of the reception signal does not exceed the threshold value, the control unit 103 maintains the communication state with the microcell base station A' (step S108).

As described above, in the terminal C' according to this embodiment, the demodulation processing unit 101f detects the interference waves from the digital IF reception signal, and the control unit 103 subtracts the frequency of the intended wave subcarrier from the frequency of the interference waves, divides the result of the subtraction by the frequency interval of the subcarrier, sets the remainder of the division as the offset frequency, and thus changes the reception frequency setting of the receiving unit 101 based on the offset frequency. Accordingly, the reception frequency setting is changed based on the offset frequency, and even if the frequency deviation (Doppler shift) occurs in the transmission signal due to high-speed movement of the terminal D' to cause the interference waves with respect to the terminal C', the signal that has no correlation with the interference waves can be received, and thus the deterioration of the reception characteristics due to the interference waves can be suppressed through demodulating the signal. Further, in the terminal C', since the operation process to be performed is only the calculation of the offset frequency, the processing is simplified, and the development cost can be reduced.

Although the embodiments of the present invention have been described as above, the present invention is not limited to the above-described embodiments, but, for example, the following modifications may be considered. (1) Although the reception frequency setting is heightened by the offset frequency according to the embodiment of the present invention, the present invention is not limited thereto. The reception frequency setting may be lowered by the value that is obtained by subtracting the offset frequency from the frequency interval of the subcarrier.

(2) Although the error rate of the reception signal is determined based on the FER according to the embodiment of the present invention, the present invention is not limited thereto. For example, the error rate of the reception signal may be determined based on a BER (Bit Error Rate), and if the BER exceeds a predetermined threshold value, step S2 may be performed.

(3) Although the present invention is applied to the base station that communicates in the OFDM method according to the embodiment of the present invention, the present invention is not limited thereto. For example, in a wireless communication system in which the downlink communication is of an OFDMA (Orthogonal Frequency Division Multiple Access) type and the uplink communication is of SC-FDMA (Single Carrier Frequency Division Multiple Access) type, the present invention may be applied thereto if the base station and the terminal function as the receiving devices.

As described above, although the preferred embodiments of the present invention have been described, the present invention is not limited to the above-described embodiments. Those skilled in the art will appreciate that various modifications and corrections are possible, without departing from the scope and spirit of the invention as disclosed in the accompanying claims. This application is based on Japanese Patent Application No. 2010-119405 filed on May 25, 2010 and Japanese Patent Application No. 2010-119406 filed on May 25, 2010 in the Japan Patent Office, the contents of which are incorporated herein by reference.

REFERENCE SIGNALS LIST

S, S': wireless communication system, A, A': microcell base station, B, B': macrocell base station, C, C', D, D': terminal, CL1, CL1', CL2, CL2': cell, 1, 101: receiving unit, 1a, 101a: antenna, 1b, 101b: amplifier, 1c, 101c: mixer, 1d, 101d: frequency adjustment unit, 1d-1, 101d-1: reference frequency oscillator, 1d-2, 101d-2: counter, 1d-3, 101d-3: phase comparator, 1d-4, 101d-4: loop filter, 1d-5, 101d-5: local signal oscillator, 1e, 101e: A/D converter, 1f, 101f: demodulation processing unit, 2, 102: transmitting unit, 2a, 102a: transmission circuit unit, 2b, 102b: antenna, 3, 103: control unit, 11, 111: receiving unit, 11a, 111a: antenna, 11b, 111b: reception circuit unit, 12, 112: transmitting unit, 12a, 112a: modulation processing unit, 12b, 112b: D/A converter, 12c, 112c: mixer, 12d, 112d: frequency adjustment unit, 12d-1, 112d-1: reference frequency oscillator, 12d-2, 112d-2: counter, 12d-3, 112d-3: phase comparator, 12d-4, 112d-4: loop filter, 12d-5, 112d-5: local signal oscillator, 12e, 112e: amplifier, 12f, 112f: antenna, 13, 113: control unit,

What is claimed is:

1. A receiving device that receives a wireless signal based on a multicarrier communication method using a plurality of subcarriers, comprising:
   a communication unit, which subtracts a frequency of an intended wave subcarrier from a frequency of interference waves if the interference waves are present in a reception signal, divides the result of the subtraction by a frequency interval of the subcarrier, sets the remainder of the division as an offset frequency, and thus changes reception frequency setting based on the offset frequency.

2. The receiving device according to claim 1,
   wherein the receiving device receives the wireless signal from a transmitting device, and
   wherein the communication unit calculates the offset frequency, changes the reception frequency setting based on the offset frequency, and transmits an instruction to change a transmission frequency based on the offset frequency to the transmitting device.

3. The receiving device according to claim 1,
   wherein the communication unit detects the interference waves of the reception signal if an error rate of the reception signal exceeds a predetermined threshold value, and calculates the offset frequency if the interference waves are present in the reception signal.

4. The receiving device according to claim 3,
   wherein the error rate is a FER (Frame Error Rate).

5. A base station that receives a wireless signal based on a multicarrier communication method using a plurality of subcarriers, comprising:
   a communication unit, which subtracts a frequency of an intended wave subcarrier from a frequency of interference waves if the interference waves are present in a reception signal, divides the result of the subtraction by a frequency interval of the subcarrier, sets the remainder of the division as an offset frequency, and thus changes reception frequency setting based on the offset frequency.

6. The base station according to claim 5,
   wherein the base station receives the wireless signal from a terminal, and
   wherein the communication unit calculates the offset frequency, changes the reception frequency setting based on the offset frequency, and transmits an instruction to change a transmission frequency based on the offset frequency to the transmitting device.

7. The base station according to claim 5,
   wherein the communication unit detects the interference waves of the reception signal if an error rate of the reception signal exceeds a predetermined threshold value, and calculates the offset frequency if the interference waves are present in the reception signal.

8. The receiving device according to claim 7,
   wherein the error rate is a FER (Frame Error Rate).

9. A wireless communication terminal that receives a wireless signal based on a multicarrier communication method using a plurality of subcarriers, comprising:
   a communication unit, which subtracts a frequency of an intended wave subcarrier from a frequency of interference waves if the interference waves are present in a reception signal, divides the result of the subtraction by a frequency interval of the subcarrier, sets the remainder of the division as an offset frequency, and thus changes reception frequency setting based on the offset frequency.

10. The wireless communication terminal according to claim 9,
    wherein the wireless communication terminal receives the wireless signal from a base station, and
    wherein the communication unit calculates the offset frequency, changes the reception frequency setting based on the offset frequency, and transmits an instruction to change a transmission frequency based on the offset frequency to the base station.

11. The wireless communication terminal according to claim 9,
    wherein the communication unit detects the interference waves of the reception signal if an error rate of the reception signal exceeds a predetermined 10 threshold value, and calculates the offset frequency if the interference waves are present in the reception signal.

12. The receiving device according to claim 11,
    wherein the error rate is a FER (Frame Error Rate).

13. The receiving device of claim 1, the communication unit comprising a receiving unit, a transmitting unit, and a control unit positioned to communicate with the receiving unit and the transmitting unit, and the control unit changes the reception frequency setting by changing a setting of the receiving unit.

14. The receiving device of claim 1, the communication unit including a frequency adjustment unit, the frequency adjustment unit further including a counter having a register, and the control unit changes the reception frequency setting by changing the register.

15. The receiving device of claim 14, the control unit provides a frequency division ratio, and the communication unit includes a mixer, a phase comparator, a reference pulse oscillator, a loop filter, and a local signal oscillator providing a local signal, the counter divides the local signal from the local signal oscillator by the frequency division ratio to provide a divided pulse signal, and the divided pulse signal is output to the phase comparator, which generates a phase difference pulse signal that is output to the loop filter, which outputs a voltage signal to the local signal oscillator for generation of the local signal for IF frequency conversion in the mixer.

16. The base station of claim 5, the communication unit comprising a receiving unit, a transmitting unit, and a control unit positioned to communicate with the receiving unit and the transmitting unit, and the control unit changes the reception frequency setting by changing a setting of the receiving unit.

17. The base station of claim 5, the communication unit including a frequency adjustment unit, the frequency adjustment unit further including a counter having a register, and the control unit changes the reception frequency setting by changing the register.

18. The base station of claim 17, the control unit provides a frequency division ratio, and the communication unit includes a mixer, a phase comparator, a reference pulse oscillator, a loop filter, and a local signal oscillator providing a local signal, the counter divides the local signal from the local signal oscillator by the frequency division ratio to provide a divided pulse signal, and the divided pulse signal is output to the phase comparator, which generates a phase difference pulse signal that is output to the loop filter, which outputs a voltage signal to the local signal oscillator for generation of the local signal for IF frequency conversion in the mixer.

19. The wireless communication terminal of claim 9, the communication unit including a frequency adjustment unit, the frequency adjustment unit further including a counter having a register, and the control unit changes the reception frequency setting by changing the register.

20. The wireless communication terminal of claim 19, the control unit provides a frequency division ratio, and the communication unit includes a mixer, a phase comparator, a reference pulse oscillator, a loop filter, and a local signal oscillator providing a local signal, the counter divides the local signal from the local signal oscillator by the frequency division ratio to provide a divided pulse signal, and the divided pulse signal is output to the phase comparator, which generates a phase difference pulse signal that is output to the loop filter, which outputs a voltage signal to the local signal oscillator for generation of the local signal for IF frequency conversion in the mixer.

* * * * *